(12) United States Patent
Poorman et al.

(10) Patent No.: US 7,283,914 B2
(45) Date of Patent: Oct. 16, 2007

(54) SYSTEM AND METHOD FOR VIBRATION MONITORING

(75) Inventors: Anne Poorman, Lyndhurst, OH (US); Oliver Gramberg, Dossenheim (DE); Chen Yang Steen, Vasteras (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 10/975,604

(22) Filed: Oct. 28, 2004

(65) Prior Publication Data

US 2006/0100797 A1    May 11, 2006

(51) Int. Cl.
- *G01F 17/00* (2006.01)
- *G01F 23/00* (2006.01)
- *G01L 7/00* (2006.01)

(52) U.S. Cl. .................... 702/56; 702/33; 73/861.18

(58) Field of Classification Search .............. None
See application file for complete search history.

(56) References Cited

U.S. PATENT DOCUMENTS

| | | | |
|---|---|---|---|
| 4,369,398 A | 1/1983 | Lowry, Sr. | |
| 4,612,620 A | 9/1986 | Davis et al. | |
| 4,885,707 A | 12/1989 | Nichol et al. | |
| 5,602,757 A | 2/1997 | Haseley et al. | |
| 5,633,811 A * | 5/1997 | Canada et al. | 702/56 |
| 5,875,420 A | 2/1999 | Piety et al. | |
| 6,092,029 A | 7/2000 | Bently | |
| 6,178,393 B1 | 1/2001 | Irvin | |
| 6,330,525 B1 | 12/2001 | Hays et al. | |
| 6,405,139 B1 | 6/2002 | Kicinski et al. | |
| 6,484,109 B1 | 11/2002 | Lofall | |
| 6,499,114 B1 | 12/2002 | Almstead et al. | |
| 6,539,267 B1 | 3/2003 | Eryurek et al. | |
| 6,567,709 B1 | 5/2003 | Malm et al. | |
| 6,633,822 B2 | 10/2003 | Maness et al. | |
| 6,694,513 B1 | 2/2004 | Andersson et al. | |
| 6,714,880 B2 | 3/2004 | Carle et al. | |
| 2002/0103828 A1 | 8/2002 | Kupiec et al. | |
| 2003/0014537 A1 | 1/2003 | Kupiec et al. | |
| 2003/0056004 A1 | 3/2003 | Argentieri et al. | |
| 2003/0200060 A1 | 10/2003 | Eryurek et al. | |
| 2004/0139085 A1 | 7/2004 | Eryurek et al. | |

FOREIGN PATENT DOCUMENTS

EP    1113366 A    7/2001

OTHER PUBLICATIONS

Fox, David et al, "Web Publisher's Construction Kit with HTML 3.2," 1996, The Waite Group, Inc, pp. 550-563.*
Trique,M: PCT International Search Report, Mar. 22, 2006.

* cited by examiner

*Primary Examiner*—John Barlow
*Assistant Examiner*—Sujoy Kundu
(74) *Attorney, Agent, or Firm*—Paul R. Katterle

(57) ABSTRACT

The present invention is directed to a system and method of monitoring assets of an enterprise, wherein the assets perform a process and include machines subject to vibration. The system includes a vibration diagnostic software system integrated with a process automation system and a computerized maintenance management system to provide a single window interface for controlling and monitoring a process, for monitoring and analyzing the vibration of the machines associated with the process and for managing the maintenance of the machines. This integration brings vibration data collection, transmission, analysis, historical recording, display and maintenance activities all together in a defined workflow.

12 Claims, 15 Drawing Sheets

FIG. 13

SYSTEM AND METHOD FOR VIBRATION MONITORING

BACKGROUND OF THE INVENTION

The present invention is directed toward vibration monitoring and, more particularly, toward a system and method for monitoring the vibration of machinery from the same point that other assets may be monitored or controlled from.

An operating machine, such as a pump or a fan, has a normal or baseline vibration pattern or signature that is characteristic of normal operation of the machine. If the machine is not operating normally, the machine will typically have a vibration signature that differs from the baseline vibration signature. Typically, this difference in vibration signature is unique to the problem with the machine, i.e., the problem causes a telltale change in the vibration signature. Thus, vibration analysis of a machine can detect developing mechanical defects long before they become a threat to the integrity of the machine, thereby providing the necessary lead-time to schedule maintenance to suit the needs of enterprise management. In this manner, vibration monitoring is the cornerstone of predictive maintenance, wherein machines are serviced based on predicted machine problems rather than actual machine failures.

To properly employ predictive maintenance for machines, vibration data is typically collected and analyzed on a scheduled basis during normal use of the machines. Conventional vibration monitoring systems collect and analyze vibration data using portable data collectors that are designed to be transported to the machines to be tested. For a particular machine, a portable data collector is connected to sensors, which are either fixedly or removably attached to the machine. The portable data collector gathers vibration data for the machine from the sensors. After such data is collected, the portable data collector is disconnected from the machine and then transported to a host computer. Vibration data from the portable data collectors is uploaded to the host computer, which runs a data screening and fault diagnostic software program that analyzes the vibration data in order to provide a system operator with advanced diagnoses of the conditions of the machines. Examples of vibration monitoring systems that operate in the foregoing manner are shown in U.S. Pat. Nos. 6,484,109; 4,8234,707 and 4,612,620.

Conventionally, vibration monitoring systems are stand-alone systems that are not tied into other plant systems for the exchange of detailed information. Thus, in a plant that utilizes a vibration monitoring system, along with a process automation system and a computerized maintenance management system (CMMS), the vibration monitoring system typically does not communicate with the process automation system or the CMMS. As a result, an operator at a workstation of the process automation system cannot access detailed information from the vibration monitoring system. In order to access such information, the operator must physically move from the workstation to the host computer of the vibration monitoring system and access the information from the host computer. In addition, in order to perform predictive maintenance, the information from the vibration monitoring must be manually input into the CMMS or written into a directory that can be accessed by the CMMS.

Based on the foregoing, there exists a need in the art for a system and method for monitoring the vibration of machinery from the same point that other assets may be monitored or controlled. The present invention is directed to such a system and method.

SUMMARY OF THE INVENTION

In accordance with the present invention, a system is provided for use in controlling a process of an enterprise and for providing a condition diagnosis of a machine in the enterprise based on vibration data collected from the machine. The system includes at least one computer and a monitor connected to the at least one computer. A diagnostic software system runs on the at least one computer and is operable to provide the condition diagnosis of the machine based on the collected vibration data. A human system interface (HSI) runs on the at least one computer and is communicably connected to the diagnostic software system. The HSI has at least one workspace for display on the monitor. The at least one workplace includes dynamic elements that can be manipulated by an operator to change control parameters for the process and a view for displaying the condition diagnosis of the machine from the diagnostic software system. A notification system runs on the at least one computer and is communicably connected to the diagnostic software system and the HSI. The notification system is operable to generate an electronic notification for transmittal to the HSI and operating personnel when the condition diagnosis of the machine changes.

Also provided in accordance with the present invention is a system and method of monitoring assets of an enterprise, wherein the assets perform a process and include a machine subject to vibration. Vibration data is collected from the machine using a data collector. A diagnostic software system provides a condition diagnosis of the machine based on the collected vibration data. A process automation system receives an operating value of the process from a field device. The operating value is not vibration and is not from a machine that is being monitored for vibration. A human system interface displays the condition diagnosis of the machine and the operating value on a computer monitor.

BRIEF DESCRIPTION OF THE DRAWINGS

The features, aspects, and advantages of the present invention will become better understood with regard to the following description, appended claims, and accompanying drawings where:

FIG. 13 is a screenshot of the plant explorer workplace showing a submit fault report view for the fault report submitter aspect;

DETAILED DESCRIPTION OF EXEMPLARY EMBODIMENTS

Figure 1:
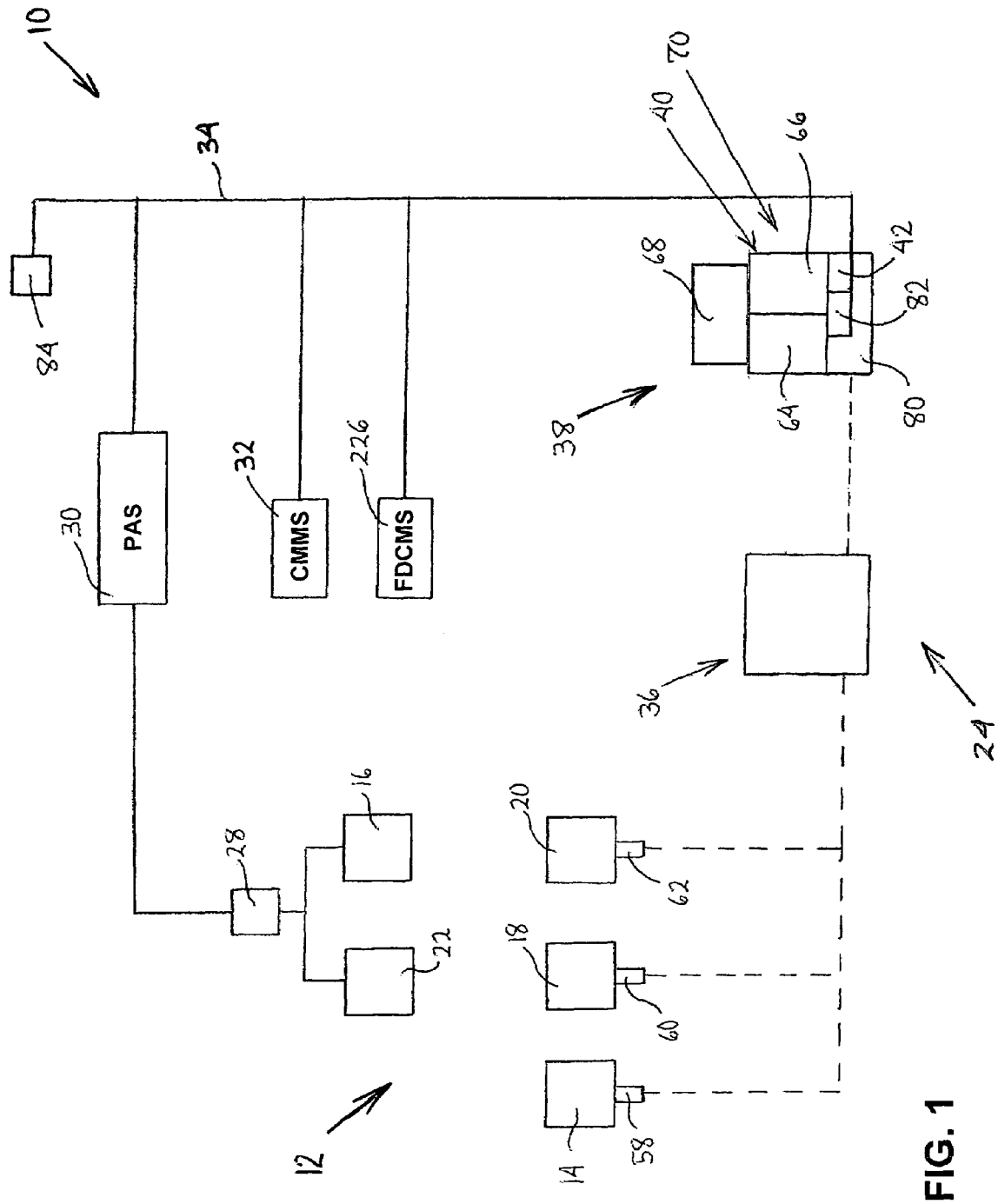
FIG. 1 is a schematic view of an enterprise having a plurality of assets.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Below is a list of acronyms used in the specification and their respective meanings:

"CMMS" shall mean computerized maintenance management system

"DCOM" shall mean distributed component object model.

"DLL" shall mean dynamic link library.

"FDCMS" shall mean field device calibration and management system

"HTML" shall mean Hypertext Markup Language.

"HTTP" shall mean Hypertext Transfer Protocol.

"ODBC" shall mean Open Data Base Connectivity, which is a method of communication to client/server databases. ODBC is part of Microsoft's Windows Open Systems Architecture, which provides a series of application program interfaces to simplify and provide standards for various programming activities.

"OPC" shall mean object linking and embedding for process control.

As used herein, the term "asset" shall mean an apparatus that performs work and, thus, has value to an enterprise.

Referring now to FIG. 1 there is shown a block diagram of an enterprise 10 that can benefit from the use of the present invention. The enterprise 10 includes a plurality of assets 12 for, inter alia, performing at least one process. The assets 12 includes at least one machine 14 that is monitored for vibration, a device 16 that is not monitored for vibration and a plurality of other assets, such as machines 18, 20 and apparatus 22. Machines 18, 20 may also be monitored for vibration. The enterprise 10 may include a single facility or a plurality of facilities located in one or more geographic locations. The enterprise 10 may be a heating and cooling plant and the processes may be the heating and cooling of a building. In such a case, the machine 14 may be a drain pump, the device 16 may be a heat exchanger, such as a condenser, the machine 18 may be a chilled water pump, the machine 20 may be a circulating water pump and the apparatus 22 may be a boiler. It should be appreciated, however, that the present invention is not limited to use in a heating and cooling plant.

For purposes of monitoring and controlling the assets 12, the enterprise 10 is provided with a vibration monitoring system 24, process field devices 28, a process automation system 30 and preferably a computerized maintenance management system (CMMS) 32, all of which are interconnected by a network 34. The vibration monitoring system 24 is integrated with the process automation system 30 and the CMMS 32 to give enterprise personnel a single window interface for controlling and monitoring the process, for monitoring and analyzing the vibration of the machines associated with the process (such as the machines 14, 18, 20) and for managing the maintenance of said machines. This integration brings vibration data collection, transmission, analysis, historical recording, display and maintenance activities all together in a defined workflow, as will be described more fully in the paragraphs below.

Vibration Monitoring System.

The vibration monitoring system 24 generally comprises at least one vibration data collector 36, a vibration work station 38, a diagnostic software system 40 and a web server 42. The vibration monitoring system 24 monitors and diagnoses the vibration of the machines 14, 18, 20 and other machines in the enterprise 10.

The vibration data collector 36 may be fixed in one position and permanently wired to the machines 14, 18, 20 or the vibration data collector may be portable and temporarily connectable to the machines 14, 18, 20, as represented by the dashed lines in FIG. 1. The data collector 36 is adapted for connection to sensors 58, 60, 62 that are either fixedly or removably attached to test points on the machines 14, 18, 20, respectively. Typically, data for three axes (axial, radial and tangential) is collected at each test point. The sensors 58–62 transform periodic, mechanical movement of the machines 14, 18, 20 into electrical analog signals, which are transmitted to and received by the data collector 36. A variety of such sensors are known in the art, including by way of example, but without limitation, eddy current position sensors and piezoelectric accelerometers. The data collector 36 samples and digitizes the analog signals from the sensors 58–62 to yield digital signals, which are then filtered and conditioned to produce digital vibration data, which is stored in the data collector 36.

The diagnostic software system 40 includes a database system 64, a diagnostic application program 66 and a human system interface (HSI) 68 with a browser. The diagnostic software system 40 may have substantially the same construction and operation as the system described in U.S. Pat. No. 6,484,109 to Lofall, which is assigned to the assignee of the present invention and is hereby incorporated by reference. A commercially available diagnostic software system that may be utilized is the ExpertALERT™ machine condition assessment software package available from DLI Engineering, a division of ABB Inc. The diagnostic software system 40 runs on a CPU 70 of the vibration work station 38. Alternately, the diagnostic software system 40 may run on a CPU 118 of a workstation 110 (shown in FIG. 2) in the process automation system 30, or on a CPU 112 of a server computer 134 (also shown in FIG. 2) in the process automation system 30.

The database system 64 stores vibration information from the data collector(s) 36 and interfaces with the diagnostic application program 66. The database system 64 includes a database and a database server. The database has one or more tables for storing information, with each table comprising one or more rows or records together with one or more columns or fields. Information can be stored in the database in a variety of different forms, including numbers, graphics files, text files, and HTML pages. The database server includes a database engine for accessing information in the database, adding information to, and removing information from, records in the database and adding records to and removing records from the database. The database engine operates in response to SQL (Structured Query Language) commands received from a client such as the HSI 68. Communication between the database engine and a client utilizes ODBC as the transfer protocol.

An operating system 80 runs on the CPU 70 of the vibration work station 38. The operating system 80 is a Windows® operating system available from Microsoft Corporation and includes a DCOM service 82 that runs with the database system 64. The vibration data collected by the vibration data collector(s) 36 may be transferred to the vibration work station 38 by temporarily connecting the vibration data collector(s) 36 to the vibration work station 38 (as indicated by the dashed lines in FIG. 1) and uploading the vibration data to the database system 64 on the vibration work station 34. Alternately, the database system 64 may also be resident on the data collector(s) 36. In such an event, the database system 64 in the vibration work station is designated the master and the database systems 64 in the data collector(s) 36 are designated as subscribers. A database synchronization system may be utilized to take newly obtained information that is uniquely stored in one of the copies of the database and replicates the new data in each of the other copies of the database so that each copy of the database contains the same information, i.e., is identical. The replication can occur over the network 34, or a radio frequency network link, or a direct or internet modem connection. An example of a database synchronization system that can be utilized is disclosed in the Lofall patent referenced above (U.S. Pat. No. 6,484,109).

Baseline vibration data for a large number of different types of machine is stored in the database system 64. The diagnostic application program 66 uses this stored data to analyze the vibrations of the machines 14, 18, 20 and other machines. More specifically, for a machine, which is of a particular type (such as a certain type of pump), the diagnostic application program 66 uses stored diagnostic rules to compare vibration data collected from the machine to baseline vibration data for the type of the machine (e.g. certain type of pump). Based on this comparison, the diagnostic application program 66 selects an appropriate condition diagnosis from a collection or library of condition diagnoses and generates a diagnosis report. The diagnosis report contains information about any diagnosed fault and provides a recommendation for remedying any such diagnosed fault. For each type of machine, the stored baseline vibration data is obtained from empirical data collected from a large number of identical, properly operating machines. The collected vibration data and the baseline vibration data may be in the form of spectrums and/or cepstrums. A cepstrum can be defined as a spectrum of a spectrum.

The web server 42 is resident on the vibration work station 38 and is a service of the operating system 80. The web server 42 generates web or HTML pages using information obtained from the database system 64 and communicates with clients on the network 34 via HTTP. The HTML pages generated by the web server 42 include diagnosis reports; fault severity trends; alarm and event lists; machine view diagrams with harmonic markers; and single axis, triaxial, and double-triax spectral and waveform displays. The HTML pages generated by the web server 42 can be accessed by a browser on a remote client 84.

Process Field Devices.

The process field devices 28 include monitoring devices (such as sensors and transmitters) and control devices (such as valves and drives) for monitoring and controlling the process. In the case where the enterprise 10 is a heating and cooling plant, the process field devices 28 include, by way of example, flow transmitters and control valves for respectively measuring and controlling the supply of fuel to burners for the boiler 22, flow transmitters and control valves for respectively measuring and controlling the supply of feedwater to the boiler 22, and flow and temperature transmitters for monitoring the characteristics of hot and cold fluids flowing through hot and cold legs of the heat exchanger 16. The process field devices 28 communicate operating values of the process to the process automation system 30 over a field network 106, which may utilize shielded twisted pair wires, coaxial cables, fiber optic cables, or wireless communication channels.

Process Automation System.

Figure 2:
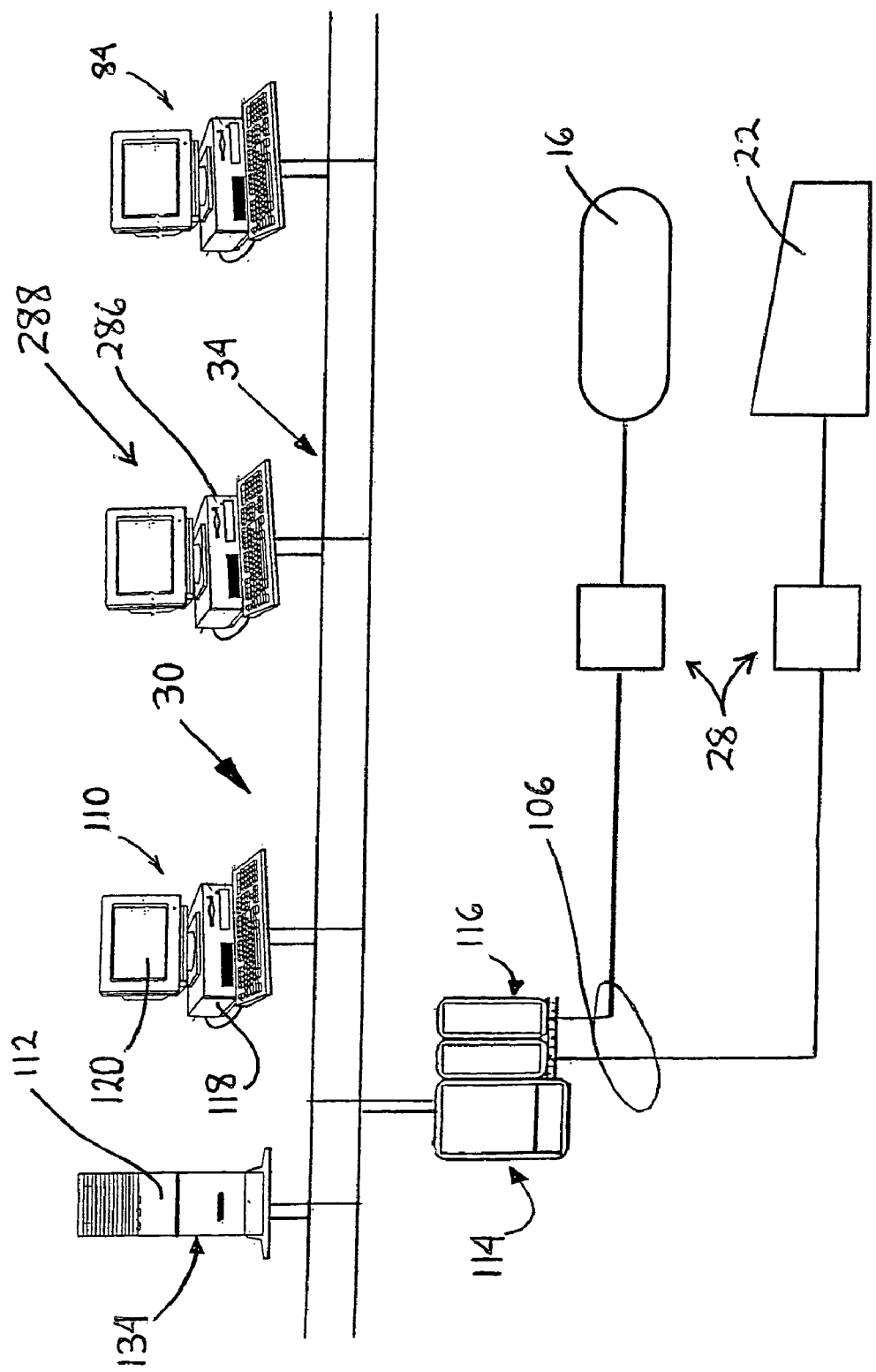
FIG. 2 is a schematic view of a process automation system connected to a heat exchanger of the enterprise.

Referring now to FIG. 2, the process automation system 30 is preferably a distributed control system, such as a System 800xA distributed control system, which is commercially available from the assignee of the present invention, ABB Inc. The process automation system 30 generally includes at least one control work station 110 and one or more controllers 114. Input signals from the field devices 28 are communicated over the field network 106 to the network 34 by 4–20 mA signaling and/or by one or more of the conventional control protocols, such as the HART® protocol, the Foundation™ Fieldbus protocol, or the Profibus protocol. For any of the field devices 28 communicating via the Foundation™ Fieldbus protocol, the field network 106 comprises HSE/H1 linking devices, which connect the field devices 28 to a high speed Ethernet subnet, which is connected to the network 34 through an FF HSE communication interface of the controller(s) 114 or through an FF OPC server (not shown). For any field devices 28 communicating via the Profibus protocol, the field network 106 comprises DP/PA linking devices, which connect the field devices 28 to a Profibus-DP line, which is connected to the network 34 through a Profibus communication interface of the controller(s) 114 or through a Profibus OPC server (not shown). For any field devices 28 communicating via 4–20 mA signaling and/or the HART® protocol, the field network 106 typically comprises shielded twisted pair wires, which connect the field devices 28 to an I/O subsystem 116, which includes one or more I/O modules with one or more associated module termination units, as is shown in FIG. 2. The I/O subsystem 116 is connected by a module bus to the controller(s) 114, which is/are connected to the network 34.

The network 34 interconnects the control work station 110, the controller(s) 114, the vibration work station 38 and optionally the vibration data collector(s) 36. The network 34 includes a pair of redundant Ethernet cables over which information is communicated using the Manufacturing Message Specification (MMS) communication protocol and a reduced OSI stack with the TCP/IP protocol in the transport/network layer. Together, the network 34 and the field network 106 help form a communication link over which information may be transmitted between the field devices 28 and clients.

The controller(s) 114 contain(s) control programs for controlling the process of the enterprise 10 and sub-processes thereof. The control programs utilize operating values from the field devices 28, which are received by the controller(s) 114 from the I/O subsystem 116. By way of example, the control programs may include a digital burner control logic scheme and an analog feedwater control logic scheme for the boiler 22 (in the case where the enterprise 10 is a heating and cooling plant). The control programs are written in one or more of the five IEC 61131-3 standard languages: Ladder Diagram, Structured Text, Function Block Diagram, Instruction List and Sequential Function Chart. Outputs from the control programs are transmitted to the control devices of the process field devices 28 over the field network 106.

The control work station 110 is a personal computer (PC) with a central processing unit (CPU) 118 and a monitor 120 for providing visual displays to an operator. The CPU 118 has an operating system running thereon, which is a Windows® operating system available from Microsoft Corporation. A human system interface (HSI) 124 and an asset optimization system 138 with asset monitors 140 run on the operating system of the control work station 110. An OPC server 126 may also run on the control work station 110, or may instead run on the server computer 134.

The OPC server 126 is based on Microsoft's OLE (now Active X), COM, and DCOM technologies. The OPC server 126 makes information from the controller(s) 114 available to any OPC client connected to the network 34, such as the HSI 124. As set forth above, an FF OPC server and/or a Profibus server may also be provided to connect the field devices 28 to the network 34 without having to be connected to the controller(s) 114. The FF OPC server and the Profibus server are also based on Microsoft's OLE (now Active X), COM, and DCOM technologies that make information available to any OPC client on the network 34.

The HSI 124 has a client/server architecture and may have communication based on OPC. A suitable human system interface that may be utilized for the HSI 124 is Process Portal™, which is commercially available from the assignee of the present invention, ABB Inc. The HSI 124 has a server 130 and a plurality of client workspaces, which will be more fully described below. The server 130 may be resident on the control workstation 110, or may instead run on the server computer 134. The server 130 includes an aspect directory 148 (shown in FIG. 9) containing all aspect objects and their aspects, as well as an aspect framework (AFW) server 150 (also shown in FIG. 9). The AFW server 150 is operable to wrap together HTML pages (aspects) for an object (e.g. the machine 14) in a web-compliant AFW file that can be launched from an object tree in the HSI 124. The AFW server 150 periodically (e.g. every 10 seconds) sends requests for data to the DCOM service 82 of the vibration workstation 38.

The server 130 implements a method of organizing information using aspect objects (or simply "objects") and aspects associated with the aspect objects. An aspect object represents a physical object (such as an asset 12) or a virtual object (such as a function) and acts as a holder or container for information (such as run time data) concerning the object. Information concerning an object is contained in its aspects. An aspect is an assembly of information describing certain properties of an aspect object, such as functional properties, physical construction properties and location properties. Information in an aspect is presented in a view, which may be a list, a table, a diagram, a drawing, or a graphic. An aspect may have more than one view. An aspect object methodology that may be utilized is set forth in U.S. Pat. No. 6,694,513 to Andersson et al., which is assigned to a sister company of the assignee of the present invention and is hereby incorporated by reference.

The aspect object methodology of the process automation system 30 utilizes at least three types of object hierarchies or structures: functional, locational and control. The functional structure shows where a particular object fits into a functional context. For example, the functional structure would show which control loops are associated with the feedwater control valves of the boiler 22 (in the case where the application 10 is a heating and cooling plant) and which field devices 28 are associated with each control loop. The locational structure shows where an object fits into the physical (geographical context). For example, the locational structure would show exactly where in the enterprise 10 the feedwater control valves are located. The control structure shows where a software function or hardware device can be found in the process automation system 30 or the vibration monitoring system 24. For example, the control structure would show which analog/digital output signals control the feedwater control valves, which output boards carry the output signals and how these signals connect to the control program controlling the feedwater control valves.

As set forth above, the HSI 124 has a plurality of workplaces that may be utilized. Each workplace comprises a collection of user-interactive functions (such as tool bars, faceplates, windows, pull-down menus, buttons, scroll bars, iconic images, wizards, etc.) that are combined for a particular use, such as controlling the process, maintaining assets 12 in the enterprise 10, or configuring a model of the enterprise 10. Enterprise personnel may select a particular workplace from a workplace login page of the HSI 124. Two of the workplaces that may be selected are an operator workplace 156 and a plant explorer workplace 158.

Figure 3:
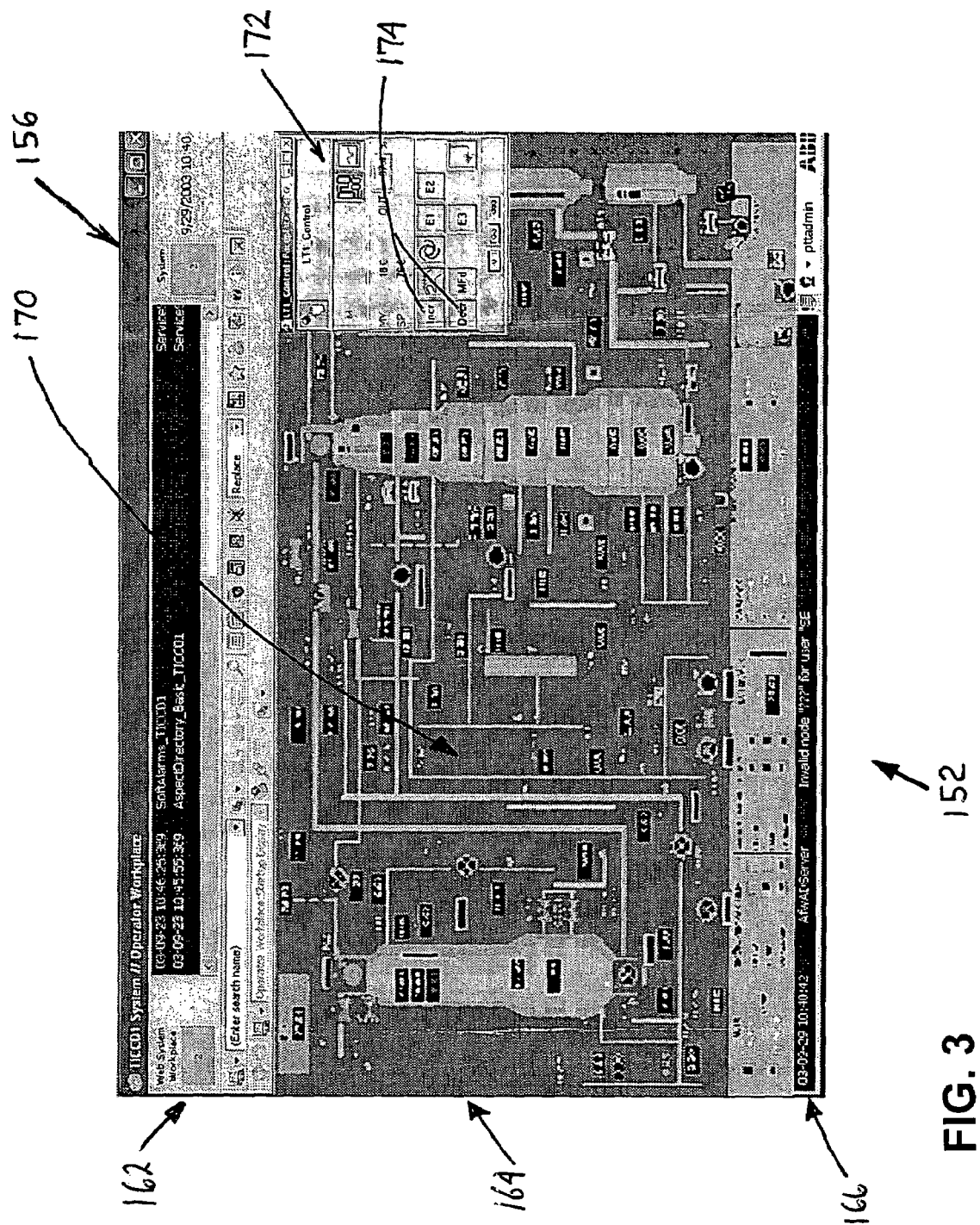
FIG. 3 is a screenshot of an operator workplace of the process automation system.

Referring now to FIG. 3, the operator workplace 156 is configured for process operators responsible for controlling the process. The operator workplace 156 includes an upper application bar 162, a central display area 164 and a lower status bar 166. The application bar 162 includes an alarm band that provides a summary display for selected alarm lists, as well as links to the alarm lists, and an alarm line that shows three of the latest alarms. The status bar 166 includes an operator message line showing the latest operator message from the process automation system 30, a button for accessing a list of the operator messages, and a current user tool for showing the identity of the current user. The display area 164 is the area from which the process is controlled. The display area 164 is used to show aspects, such as graphic displays, faceplates, alarm display and/or trend displays. For example, in FIG. 3, both a graphic display 170 and a faceplate 172 are shown. The graphic displays (such as graphic display 170) and the faceplates (such as faceplate 172) utilize Microsoft ActiveX Controls and include both static and dynamic elements. Dynamic actuation elements in the graphic displays and faceplates (such as buttons 174) are interconnected with the control programs in the controller(s) 114 and may be manipulated by an operator to: initiate state changes (e.g. block alarms or switch from manual to auto mode); change process values, limits and set-points; and acknowledge alarms. In addition to containing dynamic actuation elements, the graphic displays and the faceplates typically display operating values of the process.

Figure 4:
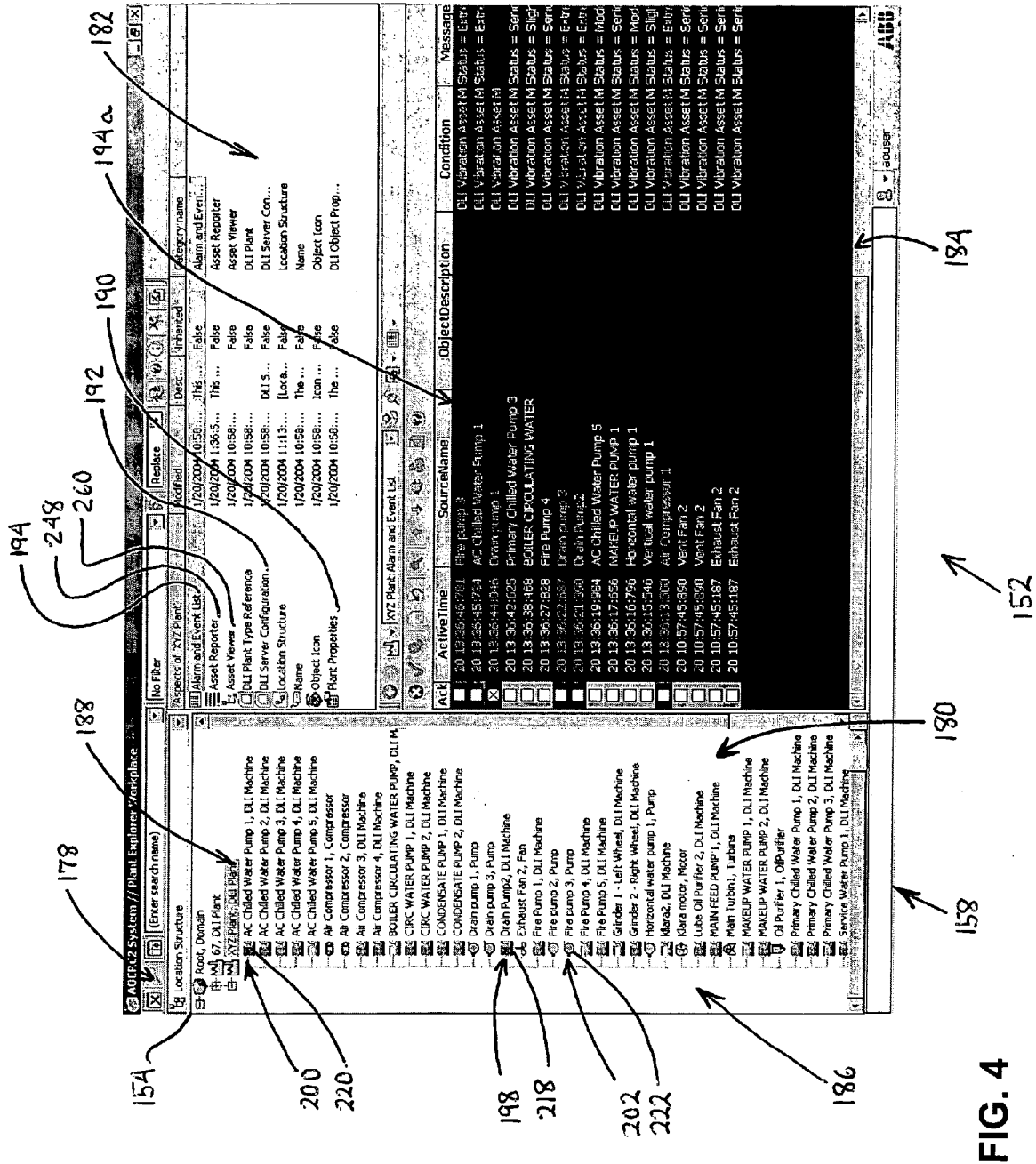
FIG. 4 is a screenshot of a plant explorer workplace of the process automation system showing an alarm and event aspect view of a plant object.

Referring now to FIG. 4, the plant explorer workplace 158 is used to explore and build hierarchically structured models of the enterprise 10. The plant explorer workplace 158 includes an application bar 178 and a plurality of frames or areas, including an aspect object area 180, an aspect list area 182 and a preview area 184. The application bar 178 includes a fixed display area, a tool collection and shortcuts. The aspect object area 180 is where the object browser displays a list or tree 186 of objects for a selected object structure (functional, locational or control), with each root object at a top level and its child objects at a lower or leaf level. An object can be accessed by right clicking on the object in an object tree 186, which opens a context menu containing a number of actions that can be performed. The aspect list area 182 displays all aspects of a currently selected object in an object tree 186. The preview area 184 displays the aspect currently selected in the aspect list area 182.

Integration of the Vibration Monitoring System with the Process Automation System As will be discussed in more detail below, the vibration monitoring system 24 is integrated at four levels into the process automation system 30:

Object Tree Integration: Objects representing machines (such as machines 14, 18, 20) that are monitored by the vibration monitoring system 24 can be displayed in an object tree 186 (such as an asset condition tree) in the plant explorer workplace 158 and in a thin client tree, which mimics an asset condition tree in the plant explorer workplace 158. The machine objects can be manually entered into a system baseline for the process automation system 30, or can be uploaded from the diagnostic software system 40 and merged with other objects in the system baseline. The machine objects can be instantiated in whatever object structure (functional, locational, or control) is desired for appropriately monitoring the machines in the context of the operation of the process and/or management of the enterprise 10.

View Integration: Selected views from the diagnostic software system 40 are rendered as aspects in the plant explorer workplace 158.

Thin Client Integration: Selected views from the diagnostic software system 40 are thin client compatible for viewing from an asset condition tree. As will be described further below, an asset condition tree displays icons, each of which indicates a fault report for a change in status of a machine.

Notification Integration: The asset optimization system 138 determines whether a notification needs to be sent to the CMMS 32 for generating a work order and/or to a system messaging service 238 to notify enterprise personnel that action needs to be taken.

Object Tree Integration

Referring now to FIGS. 4–7B, windows or views of the plant explorer workplace 158 are shown. An object 188 for all of the vibration-monitored machines of the enterprise 10 is provided in an object structure of the plant explorer workplace 158 and is referred to as the "plant object". Aspects for the plant object 188 are provided and include a plant properties aspect 190, a server configuration aspect 192 and an alarm and event list aspect 194. The plant properties aspect 190 stores a numerical identification and a name (such as "XYZ plant") for the collection of vibration-monitored machines (e.g. machines 14, 18, 20) of the enterprise 10, while the server configuration aspect 192 provides a view 192*a* (shown in FIG. 5) that contains information for connecting the process automation system 30 to the database system 64 and the web server 42 of the vibration monitoring system 24.

All of the vibration-monitored machines of the enterprise 10 are provided with objects that may be child objects of the plant object 188 and will hereinafter be referred to as "machine objects". For example, the machines 14, 18, 20 are provided with machine objects 198, 200, 202, respectively. An aspect for machine properties, an aspect for a vibration asset monitor (which will be more fully described below) and an aspect for a vibration monitoring view are provided for each of the machine objects. For example, machine properties aspects 203, 204, 205 are provided for machine objects 198, 200, 202, respectively; vibration asset monitor aspects 206, 207, 208 are provided for machine objects 198, 200, 202, respectively; and vibration monitoring view aspects 209, 210, 211 are provided for machine objects 198, 200, 202, respectively.

Figure 6:
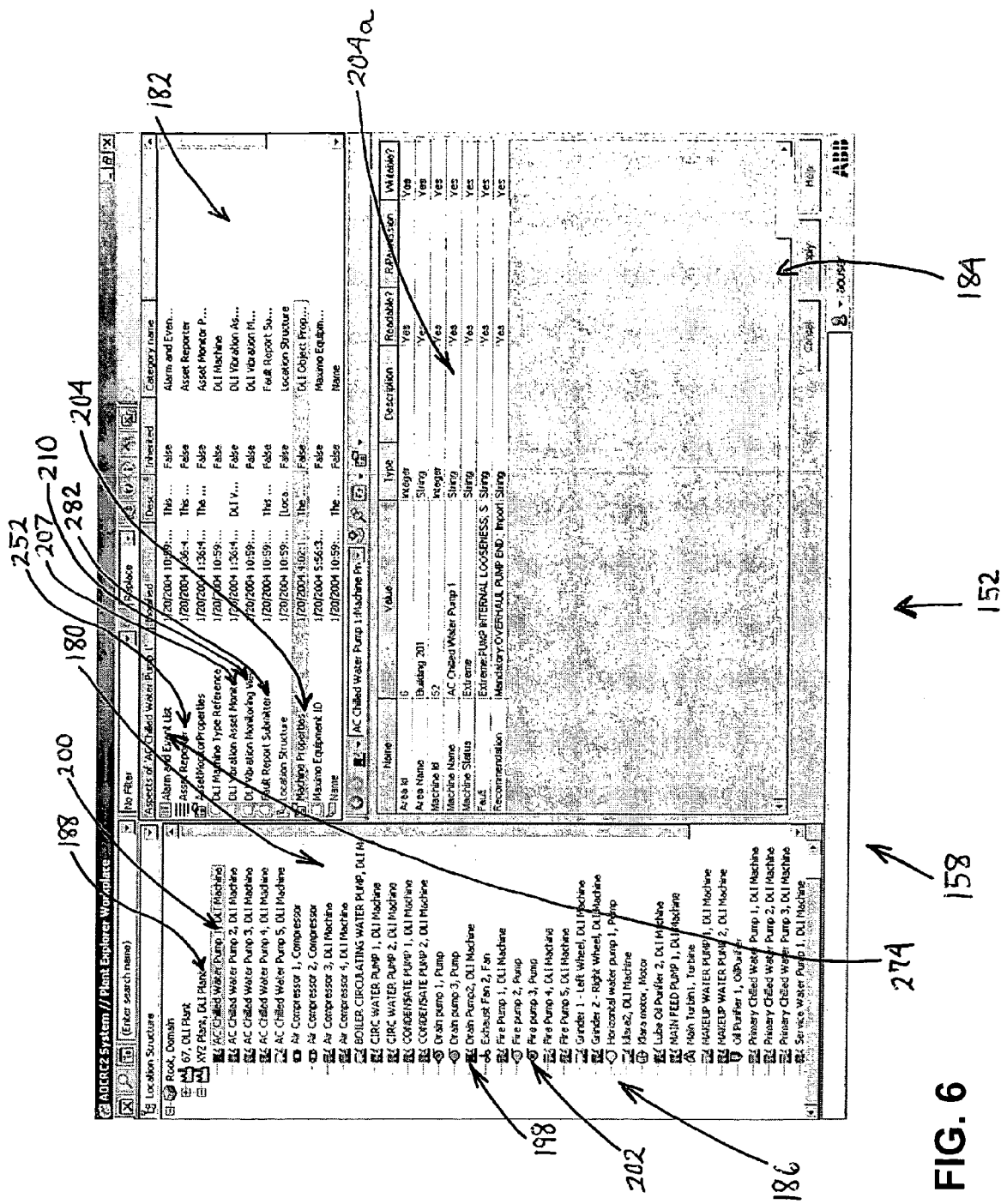
FIG. 6 is a screenshot of the plant explorer workplace showing a machine properties aspect view of a machine object.

Referring now to FIG. 6, for a particular machine object (such as the machine object 200), the machine properties aspect (such as machine properties aspect 204) provides a view (such as view 204*a*) that includes the identification and name of the corresponding machine (e.g. machine 18), the area of the enterprise 10 where the machine is located, and status, fault and repair recommendations for the machine.

Although the machine objects are shown in FIGS. 4–7B (as well as FIGS. 11–15) as being arranged in an object tree 186 in a locational object structure, separate from objects for other assets 12, it should be appreciated that the machine objects may also be arranged in control and/or functional object structures with objects for other assets 12 of the enterprise.

The device 16, the apparatus 22 and other assets 12 of the enterprise 10 are also provided with objects. For example, the device 16 is provided with an object 242 (shown in FIG. 10), having aspects, such as a heat exchanger asset monitor 246. The objects for the device 16, the apparatus 22 and other assets 12 may be arranged in object trees 186 in locational, control and/or functional object structures separate from, or combined with, the machine objects.

Figure 5:
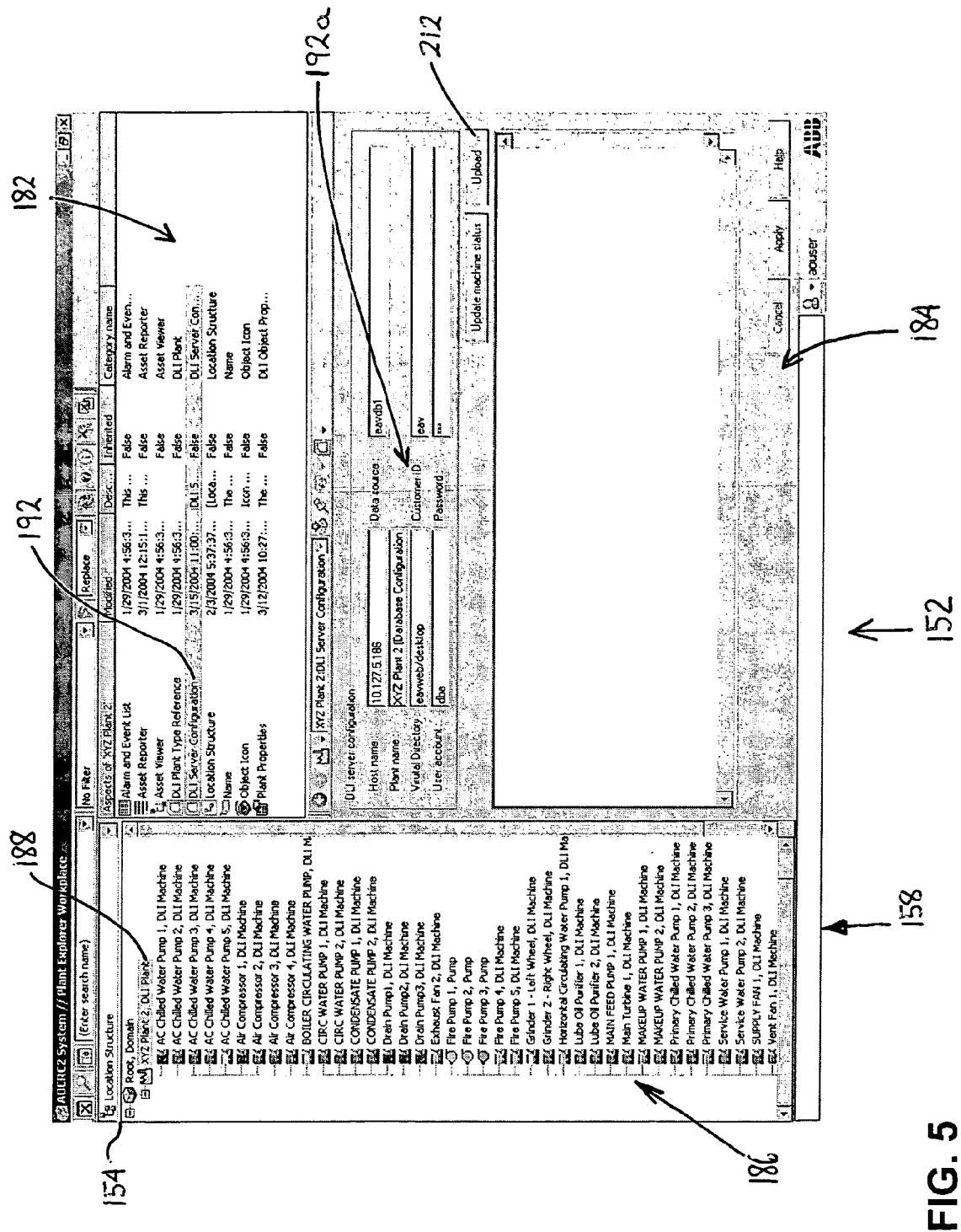
FIG. 5 is a screenshot of the plant explorer workplace showing a server configuration aspect view of the plant object.
Figure 8:
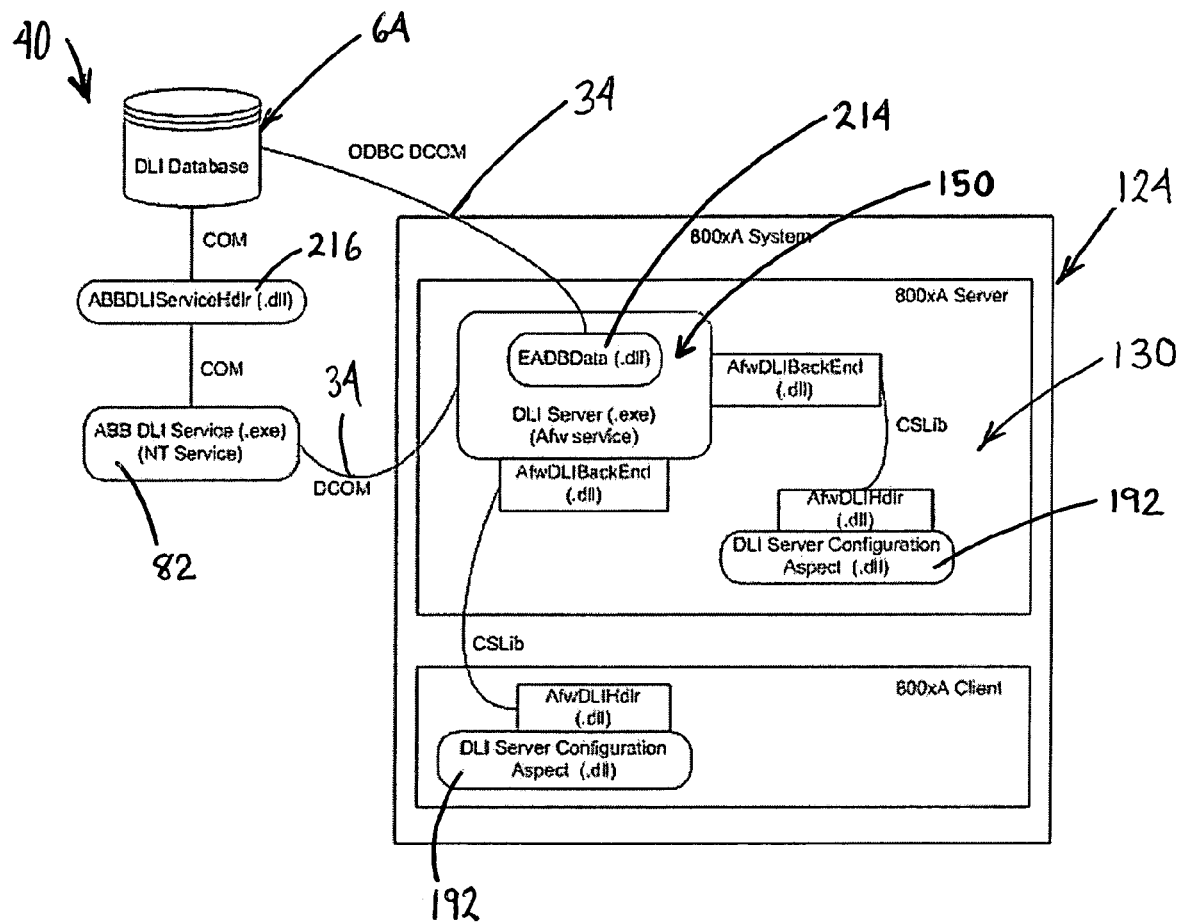
FIG. 8 is a schematic diagram of communication between the process automation system and a database system of a diagnostic software system.

With particular reference now to FIG. 8 and FIG. 5, machine objects (such as machine objects 198, 200, 202) may be created using an upload operation, which is initiated by actuating an upload button 212 of the server configuration aspect 192. When the upload button 212 is actuated, the server configuration aspect 192 transmits configuration data (e.g. the name of the database server, the name of the database, user credentials, plant name) to the AFW server 150 and requests database data from the AFW server 150. Using the configuration information, a database data collector DLL 214 of the AFW server 150 assembles an SQL query and transmits the SQL query over the network 34 to the database server of the database system 64 using ODBC DCOM. In response to the SQL query, the database server retrieves data from the database and transmits the data back to the database data collector DLL 214, which then forwards the data to the server configuration aspect 192. Using the returned data, the server configuration aspect 192 creates the child objects in the aspect directory 148 and populates them with aspects. If a machine object already exists as a child object, the server configuration aspect 192 will not overwrite the existing machine object. Instead, the server configuration aspect 192 will only update information of the machine object, such as its name, identification number and status information.

A machine object uploaded from the database system 64 or manually entered into the system baseline may be merged with any other object by selecting a "join object with" function from a context menu for the machine object. When the "join object with" function is selected, an object browser appears and provides a list of objects from which an object to be joined may be selected. Once the object to be joined is selected, the machine object and the selected object are merged into a single object having all of the aspects of the machine object and the selected object, with the object icon being taken from the selected object. An example of the merger of a machine object with another object is the merger of machine object 200 for the machine 18 and the object 242 (shown in FIG. 10) for the device 16, which may be desirable in the event the machine 18 is associated with the device 16, such as may occur when the enterprise 10 is a heating and cooling plant and the machine 18 is a chilled water pump and the device 16 is a heat exchanger. With such a merger, the resulting object has all the aspects of the machine object 200 and the object 242. In this manner, vibration information about a vibration-monitored machine (machine 18) and non-vibration information about a device (device 16) that is not monitored for vibration are accessible from a single object.

The process automation system 30 obtains updated data from the database system 64 over the network 34 through an automatic update operation, which utilizes an update trigger (not shown) in the database system 64 that monitors the status of the vibration-monitored machines (such as the machines 14, 18, 20). When the status of one of the machines 14, 18, 20 or other vibration-monitored machines changes, the update trigger transmits the identity of the changed machine and the new status information of the machine to the DCOM service 82 through a handler DLL 216. The DCOM service 82 then forwards this information to the AFW server 150. When the AFW server 150 receives the new status information from the DCOM service 82, the AFW server 150 updates the data for the changed machine stored in the aspect directory 148. The updated data for the changed machine in the aspect directory 148 is then picked up by the aspects for the machine, such as the vibration asset monitor.

The status of each vibration-monitored machine, as represented in the machine object therefor, is updated when the upload operation or the automatic update operation is performed. The status of each vibration-monitored machine is displayed in the object tree 186 in the aspect object area 180 via an icon associated with the machine object for the machine. For example, machines objects 198, 200, 202 have icons 218, 220, 222 (shown in FIG. 4). The icon for each machine object will have a particular color for a particular status condition. For example, if the machine is in good condition, the icon will be green, whereas if the machine has extremely serious faults, the icon will be red.

View Integration

Figure 7A:
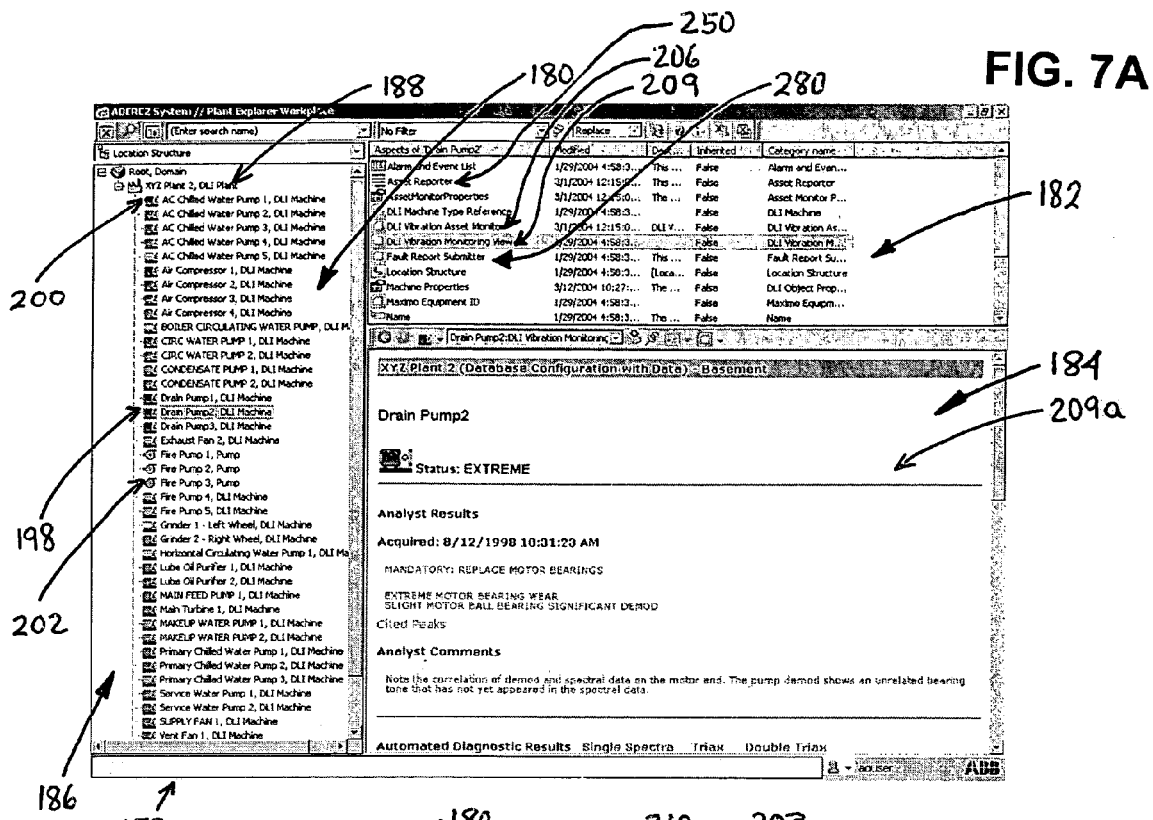
FIG. 7A is a screenshot of the plant explorer workplace showing a first portion of a vibration monitoring aspect view of a machine object.
Figure 7B:
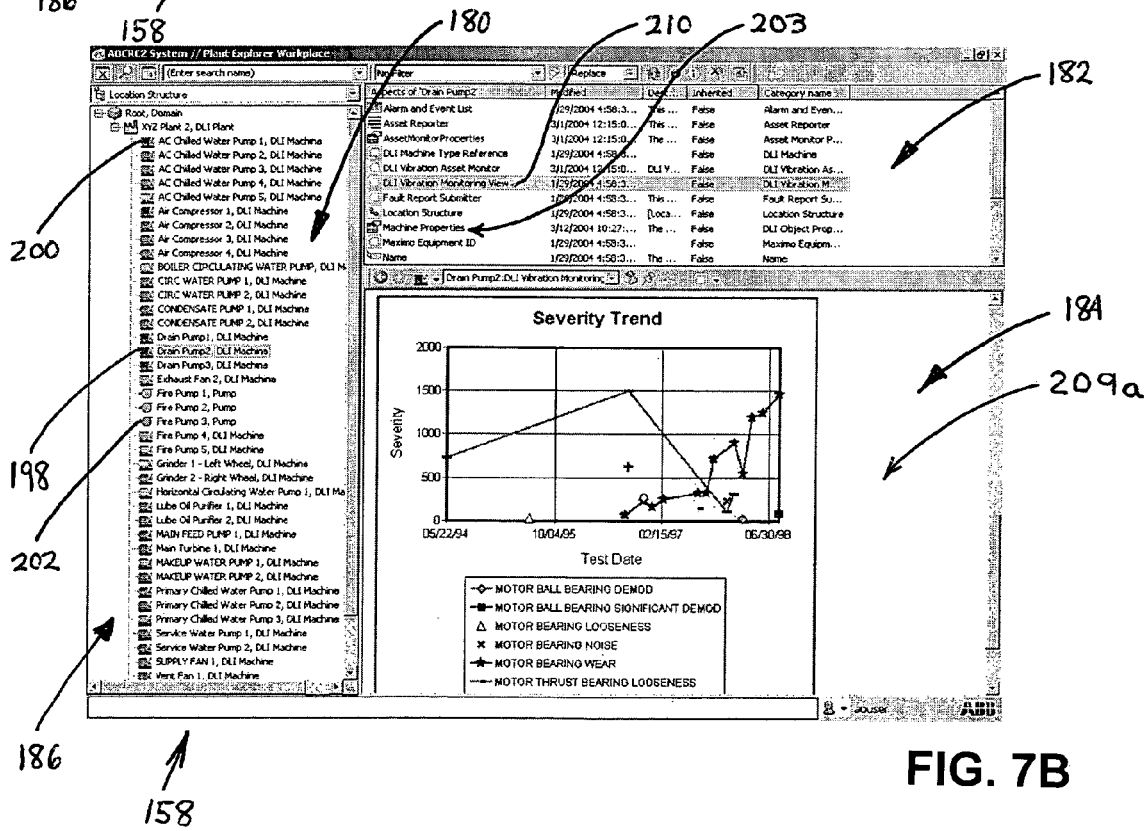
FIG. 7B is a screenshot of the plant explorer workplace showing a second portion of the vibration monitoring aspect view of the machine object.

Referring now to FIGS. 7A, 7B, the vibration monitoring view aspect (such as the vibration monitoring view aspect 209) uses information from the machine properties aspect (like machine identification) and information from the server configuration aspect (like host name, virtual directory name and customer identification) to generate a Uniform Resource Locator (URL), which is sent to the web server 42 of the vibration monitoring system 24. Based on this URL, the web server 42 creates an HTML page, which the vibration monitoring view aspect receives and displays as a view (such as view 209*a*). The view (and, thus, the HTML page) contains the current status of the machine (e.g. "extreme"), a condition diagnosis of the machine made by the diagnostic software system 40 (e.g. "extreme motor bearing wear"), a recommendation generated by the diagnostic software system 40 (e.g. "replace motor bearing") and severity trends for different analyses. The vibration monitoring view aspect is implemented in Microsoft Visual Basic.

Asset Optimization Features (Asset Monitors, Thin Client, Notification)

Figure 9:
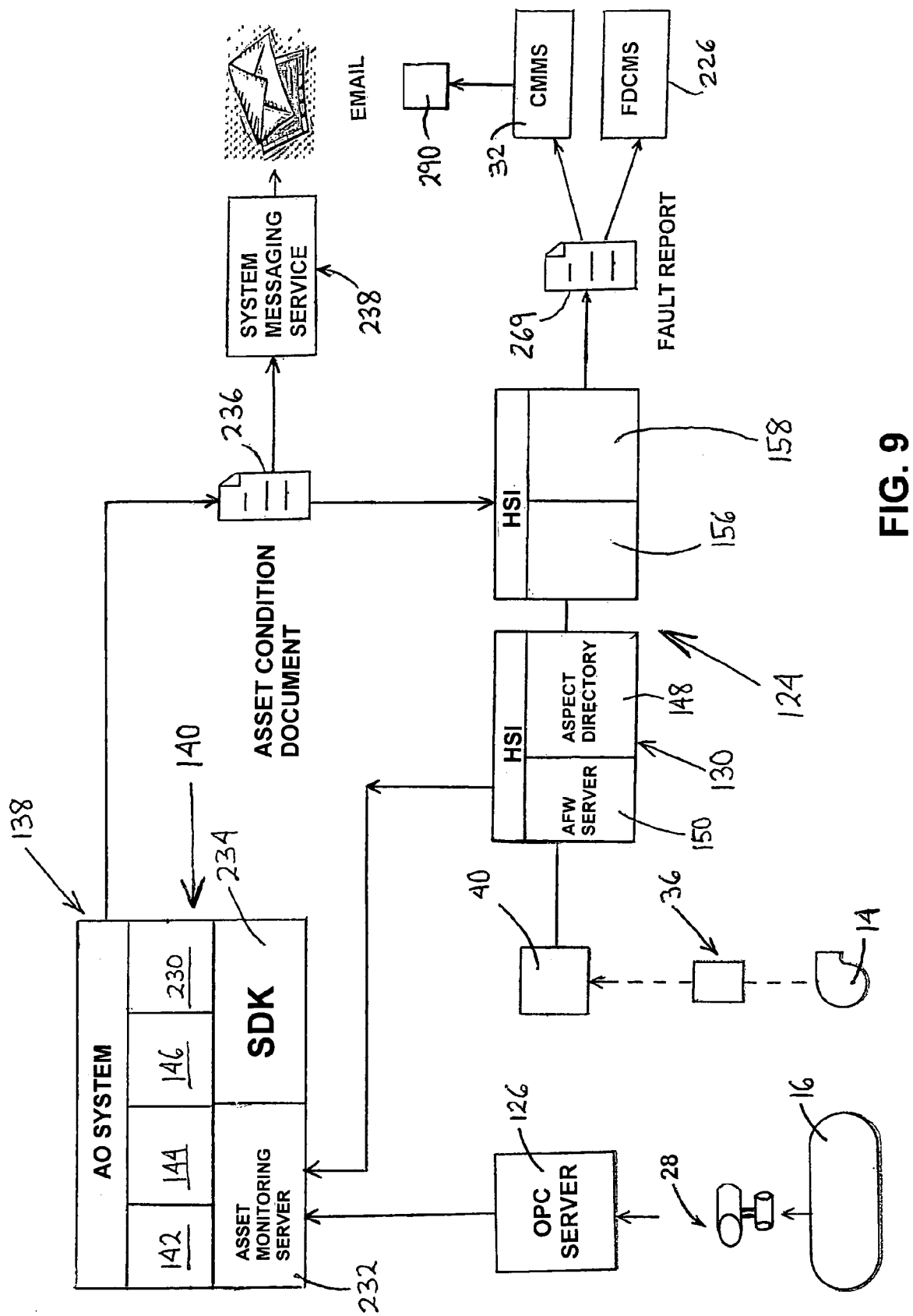
FIG. 9 is a flow chart showing the flow of information from a vibration-monitored machine and a heat exchanger through the process automation system to a computerized maintenance management system.

Asset Monitors. Referring now to FIG. 9, the thin client integration and notification integration are accomplished using the asset optimization system 138. The asset optimization system 138 integrates asset monitoring and decision support applications with the HSI 124, as well as the CMMS 32 and typically a field device calibration and management system (FDCMS) 226. A strategic maintenance management software package sold under the tradename MAXIMO® by MRO Software, Inc. has been found suitable for use as the CMMS 32, while a device management software package sold under the tradename DMS by Meriam Process Technologies has been found suitable for use as the FDCMS 226. The asset optimization system 138 has the asset monitors 140, which include vibration asset monitors 142, 144, 146, an asset monitor 230 for the device 16 and other asset monitors, which may monitor other physical components of the process and/or process field devices 28 and information technology assets of the process automation system 30. In an exemplary embodiment of the present invention, all of the vibration-monitored machines have asset monitors. The asset optimization system 138 also includes an asset monitoring server 232 and a software development kit (SDK) 234, which may be based on Visual Basic® from Microsoft Corporation, which can be used to create custom asset monitors. The asset optimization system 138 may have an architecture substantially in accordance with the AO architecture described in U.S. patent application Ser. No. 09/770,167 (Publication Number US2002/0103828A1), which is assigned to the assignee of the present invention and is hereby incorporated by reference.

The asset monitoring server 232 interacts with the OPC server 126 and/or the FF OPC server and/or the Profibus server to receive operating values from the process field devices 28 over the network 34. In addition, the asset monitoring server 232 receives information (such as vibration data, fault diagnoses and suggested remedial action) from the diagnostic software system 40 over the network 34, via the AFW server 150.

The asset monitors 140 may be written in Visual Basic® using the SDK 234 and their parameters may be defined using Excel. Standard asset monitors 140 can be configured to perform Boolean checks, quality checks, runtime accumulation checks, high, low, high/low limit checks, XY profile deviation checks and flow delta checks. The parameters of the asset monitors 140, such as conditions and subconditions, may be defined using Excel™, which is a spreadsheet program from Microsoft Corporation. Custom asset monitors 140 can be written in Visual Basic, Visual C++, or other programs. Outputs of the asset monitors 140 must be in an asset condition document format. A condition of an asset monitor 140 can be a variable (such as vibration) of an asset being monitored (such as the machine 14), while a subcondition can be the quality or status of the condition, such as "normal" or "extreme". An asset monitor 140 can be configured such that if a subcondition is met (such as "extreme"), the asset monitor 140 creates an asset condition document 236, which is an XML file containing all information necessary to describe an asset condition. The asset condition document 236 is transmitted to the HSI 124 and may also be reformatted and sent to the system messaging service 238 for delivery to plant operating personnel via email and/or pager. The system messaging service 238 permits plant operating personnel to subscribe to a plurality of asset monitors 140 for which the plant operating personnel desire to receive status change information.

The vibration asset monitors 142, 144, 146 are provided as aspects (206, 207, 208) to the machine objects 198, 200, 202, which, as set forth above, are child objects to the plant object 188 in the plant explorer workplace 158. Each vibration asset monitor 142, 144, 146 has a condition of "vibration" and five sub-conditions, namely "not tested/OK", "slight", "moderate", "serious" and "extreme". Each vibration asset monitor aspect (such as vibration asset monitor aspect 206) provides a detailed view of the condition and the subconditions of the associated asset monitor (such as asset monitor 142). The status of the subconditions is provided by text, as well by color, with the color being selected based on the nature of the status.

Figure 10:
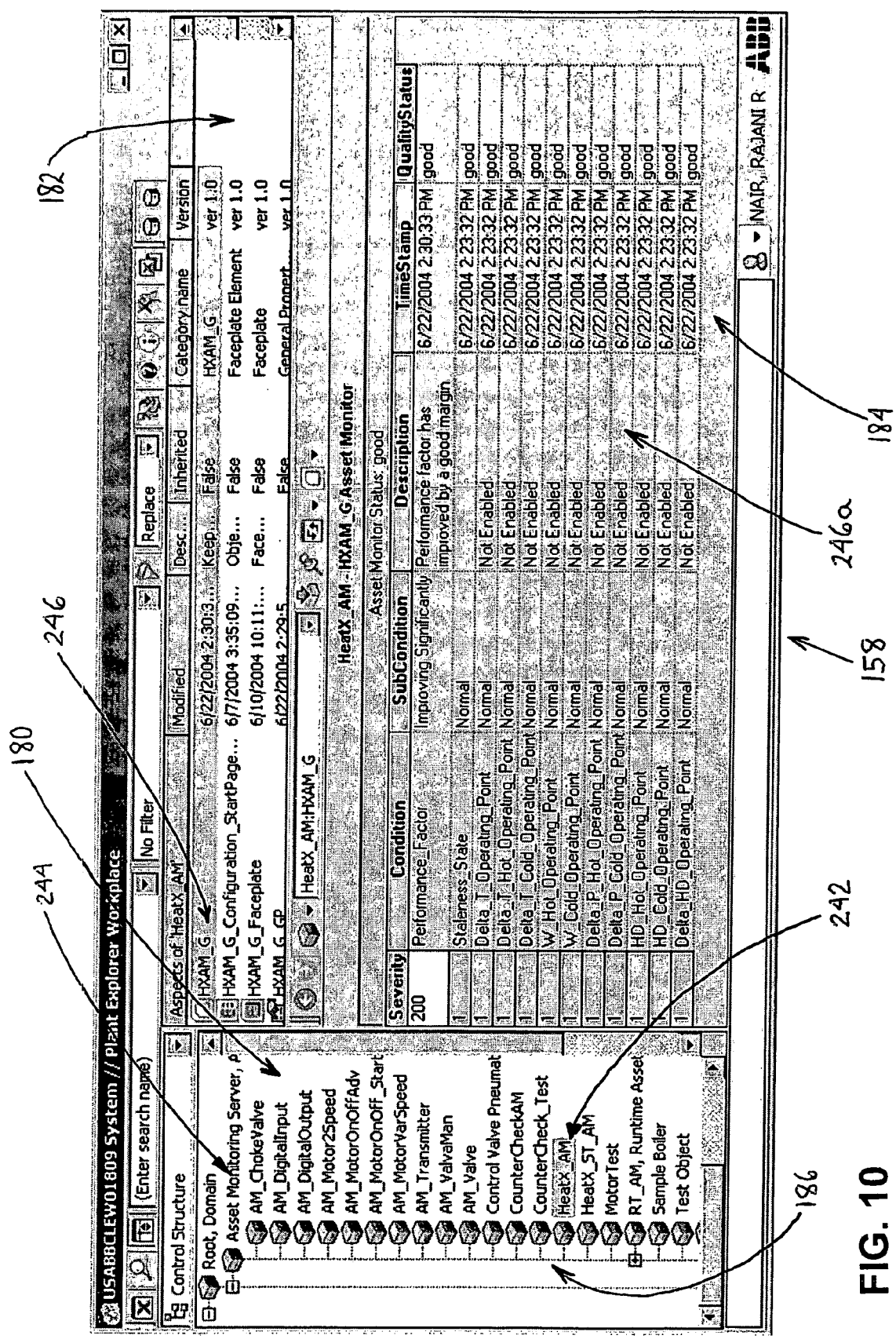
FIG. 10. is a screenshot of the plant explorer workplace showing an asset monitor aspect view of an object for the heat exchanger.

Referring now to FIG. 10, the asset monitor 230 for the device 16 is provided as an aspect 246 to the object 242 for the device 16. In the case where the enterprise 10 is a heating and cooling plant and the device 16 is a heat exchanger, the asset monitor 230 for the device 16 may have the same construction and function as the heat exchanger asset monitor disclosed in applicant's co-pending patent application (Ser. No. 10/896,732) entitled A SYSTEM AND METHOD FOR MONITORING THE PERFORMANCE OF A HEAT EXCHANGER, which is hereby incorporated by reference. With such a construction, the asset monitor 230 provides a measure of the performance (referred to as "E") of the device 16 without using any information concerning the physical construction of the device 16. The measure of performance, E, is calculated using only differential temperatures. The asset monitor aspect 246 provides a detailed view 246A of the condition and the subconditions of the asset monitor 230. Once again, the status of the subconditions is provided by text, as well by color, with the color being selected based on the nature of the status. In the event the object 242 and the machine object 200 are merged together, as contemplated above, the resulting object has both the aspect 246 for the asset monitor 230 for the device 16 and the aspect 207 for the asset monitor 144 for the machine object 200.

Asset Reporter and Viewer (Including Thin Client)

Referring back to FIG. 4, an asset reporter aspect 248 is provided for the plant object 188 in the plant explorer workplace 158. In addition, an asset reporter aspect is provided for each of the machine objects. For example, asset reporter aspects 250, 252, 254 are provided for machine objects 198, 200, 202, respectively. An asset reporter aspect (not shown) is also provided for the object 242 in the control object structure of the plant explorer workplace 158. An asset reporter provides a list of all asset monitors for an associated object, along with the statuses of the asset monitors.

Figure 11:
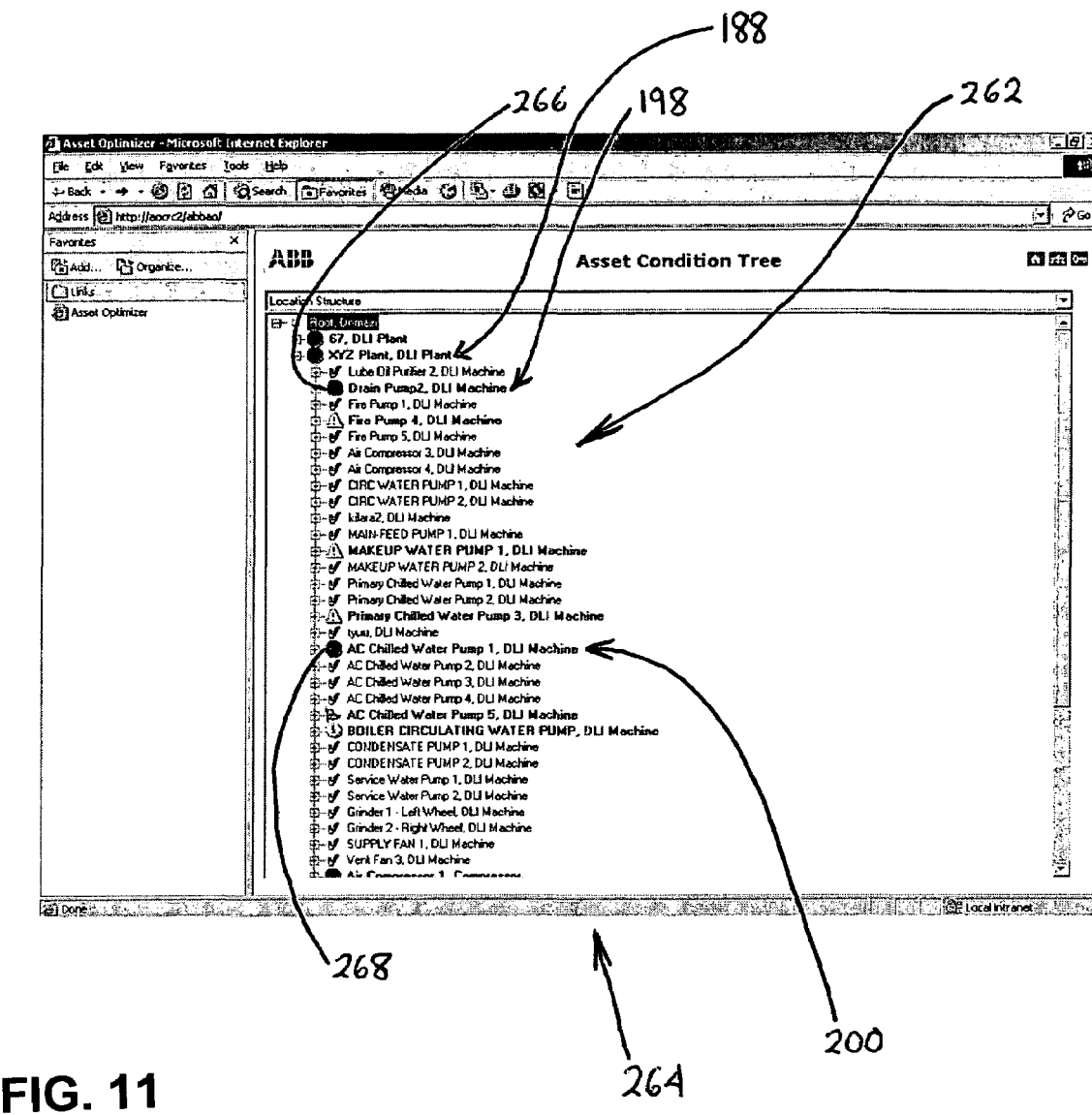
FIG. 11 is a screenshot of a thin client view of an asset tree.

An asset viewer aspect 260 is provided for the plant object 188. The asset viewer aspect 260 displays the machine objects in an asset condition tree 262 (shown in FIG. 11). The asset viewer aspect 260 is accessible in the aspect object area 180 of the plant explorer workplace 158, as well as in the operator workplace 156. The asset viewer aspect 260 is also accessible as a web-enabled view on a remote client that is not part of the process automation system 30, i.e., the asset viewer aspect 260 is accessible on a thin client. A thin client, such as the remote client 84 in FIG. 2, accesses the asset viewer aspect 260 through a web server on the machine hosting the asset monitoring server 232. A thin client view 264 of the asset condition tree 262 is shown in FIG. 11. The statuses of the machine objects (and thus the machines) are displayed in the asset condition tree 262 via icons associated with the machine objects, respectively, with the form of the icons being based on the nature of the statuses. For example, the machine objects 198, 200, are provided with icons 266, 268, respectively. When a machine object is in a normal condition, the icon will be a check mark, whereas if the machine object is in an extremely severe non-normal condition (such as machine objects 198, 200), the icon (such as icons 266, 268) will be a red circle with a cross through it. Each icon represents the composite severity of its associated machine object and its children. The icons may be preset, or may be configurable by enterprise personnel.

The thin client view 264 of the asset condition tree 262 is the same as the views of the asset condition tree 262 in the operator and plant explorer workplaces 156, 158, except the thin client view 264 is not dynamically updated when the status of a machine changes. Instead, the thin client view 264 must be updated through a manual refresh.

The statuses of the objects and the subconditions thereof that are displayed in the asset condition tree 262 and the asset reporters are determined by the asset condition documents 236 issued by the asset monitors 140. When an asset monitor 140 issues an asset condition document 236 for a change in status (i.e., a new subcondition is met), the icon displayed in the asset condition tree 262 and the color of the subcondition in the corresponding asset reporter are changed. In addition, if the change in status is from normal or OK to an abnormal condition, an alarm and an electronic fault report 269 are automatically created.

Notification (A&E). As set forth above, an alarm and event list aspect 194 is provided for the plant object 188, as shown in FIG. 4. An alarm and event list aspect is also provided for each of the machine objects. For example, alarm and event list aspects 274, 276, 278 are provided for the machine objects 198, 200, 202, respectively. For the plant object 188, the alarm and event list aspect 194 provides a view 194a that shows all alarms and events generated by all of the machine objects, whereas for a particular machine object, the alarm and event list aspect shows all alarms and events generated by that particular machine object. The alarm and event list aspect shows the severity and time of occurrence of the alarms and events.

Figure 12:
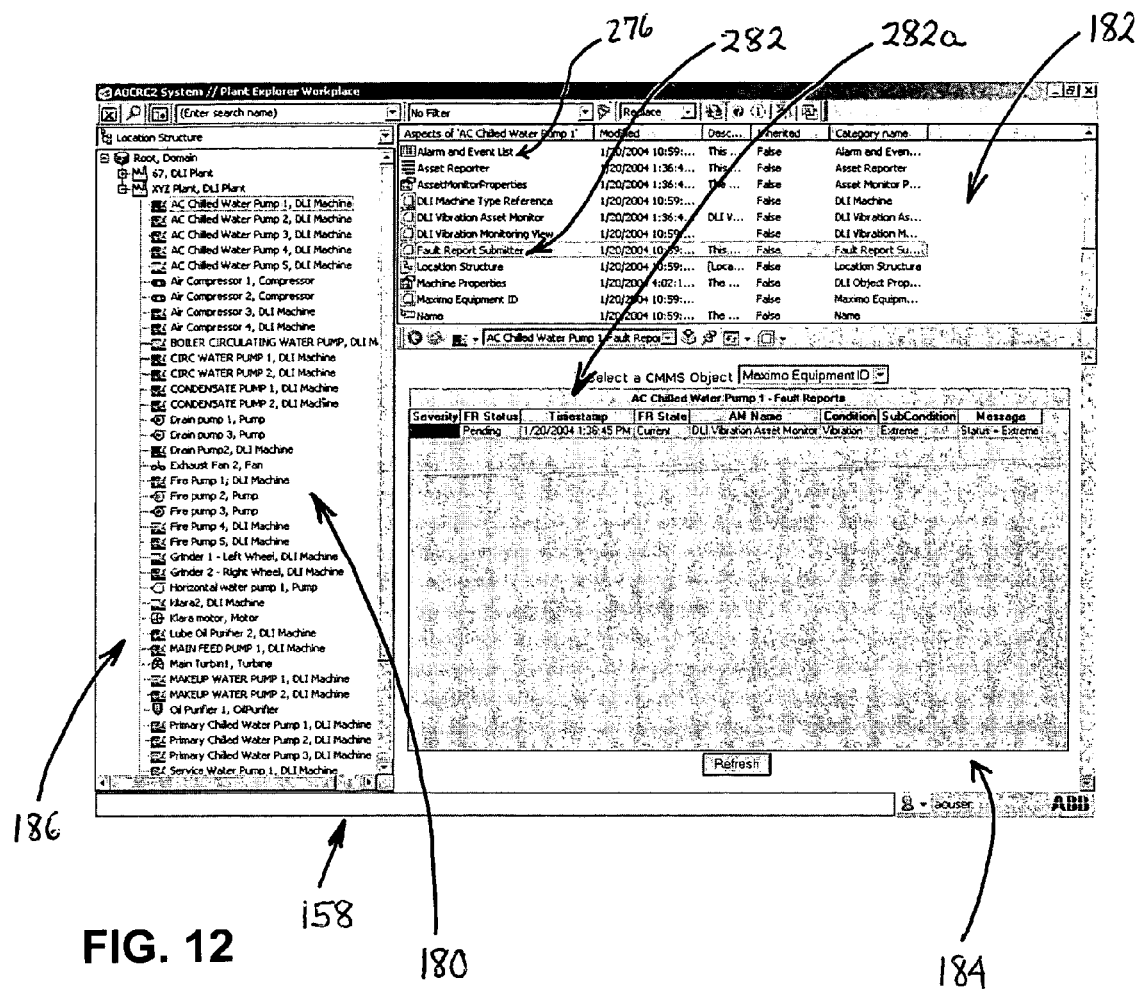
FIG. 12 is a screenshot of the plant explorer workplace showing a fault report viewer of a fault report submitter aspect of a machine object.
Figure 13:
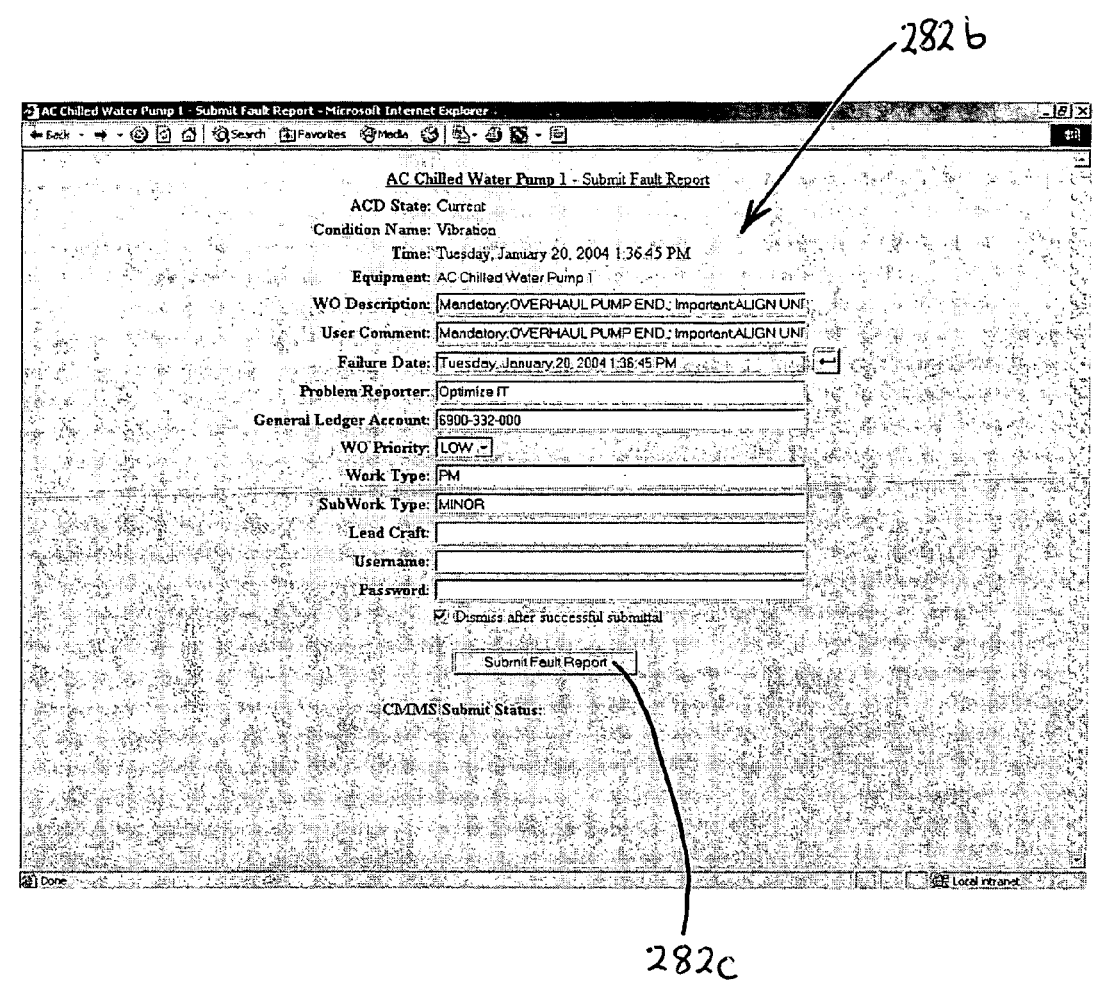

Notification (CMMS). A fault report submitter aspect is provided for each machine object for a machine having an asset monitor. For example, fault report submitter aspects 280, 282, 284 are respectively provided for machine objects 198, 200, 202, which are respectively provided for machines 14, 18, 20, which respectively have vibration asset monitors 142, 144, 146. A fault report submitter aspect may be accessed from the aspect list area 182, or from the asset condition tree 262 or an asset reporter by right clicking on the relevant icon in the asset condition tree 262 or the subcondition in the asset reporter, as the case may be, which produces a pop-up context menu that provides access to the fault report submitter aspect. Each fault report submitter aspect has a fault report viewer that shows all fault reports for an associated asset monitor. For example, fault report submitter aspect 282 has a fault report reviewer 282a that shows the fault report 269 that has been issued by the asset monitor 144, as is shown in FIG. 12. Right-clicking anywhere in a fault report row produces a context menu with the option to dismiss or submit the fault report 269. If the fault report 269 is to be submitted, a submit fault report view is launched. For example, a submit fault report view 282b for the fault reporter aspect 282 is shown in FIG. 13. The submit fault report view includes a description of the work that should be performed (work order) and a submit button (e.g. submit button 282c). The WO description contains the fault diagnosis and recommended remedial action produced by the diagnostic software system 40. When a user clicks the submit button (e.g. 282c) in the submit fault report view (e.g. 282b), the fault report 269, containing the information from the submit fault report view (e.g. 282b), is submitted to the CMMS 32 and the FDCMS 226.

Referring now to FIGS. 2 and 9, the CMMS 32 runs on a CPU 286 of a computer 288 that is connected to the process automation system 30 by network 34. The CMMS 32 generates, issues and tracks job plans, work orders 290 and preventive maintenance schedules for the assets 12 of the enterprise 10. A work order 290 from the CMMS 32 is electronic and contains comprehensive and detailed information for work that needs to be performed on an asset 12. Such information includes a description of the work that needs to done and a plan and a schedule for performing the work. Such information also typically includes the amount, type and cost of labor, material and equipment required to perform the work. A work order 290 may also reference or include information from failure analysis and safety-related documents. A work order 290 is transmitted to maintenance personnel who will perform the work order 290 to remedy the fault of the concerned machine.

Figure 14:
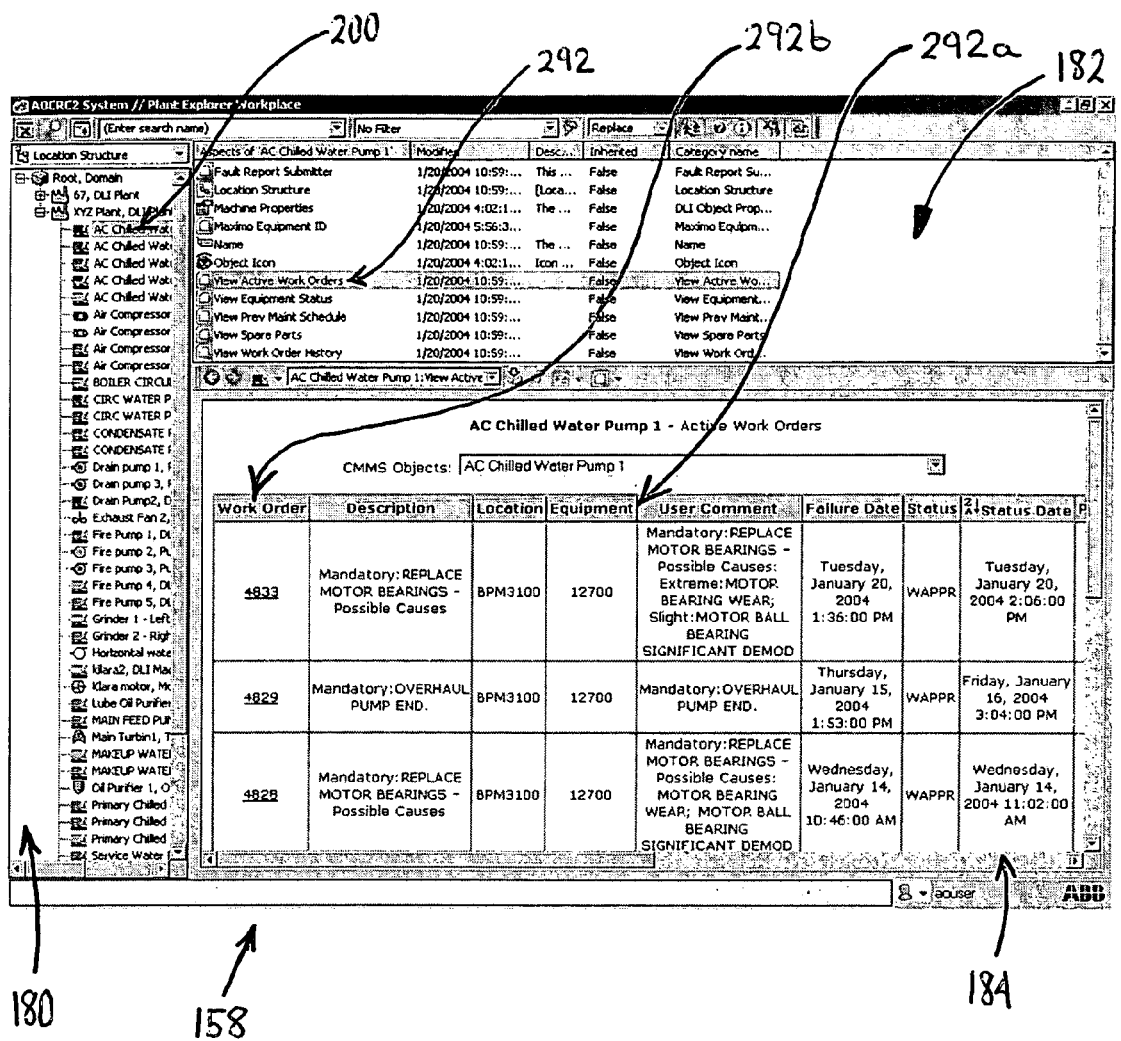
FIG. 14 is a screenshot showing an active work order aspect view of a machine object.
Figure 15:
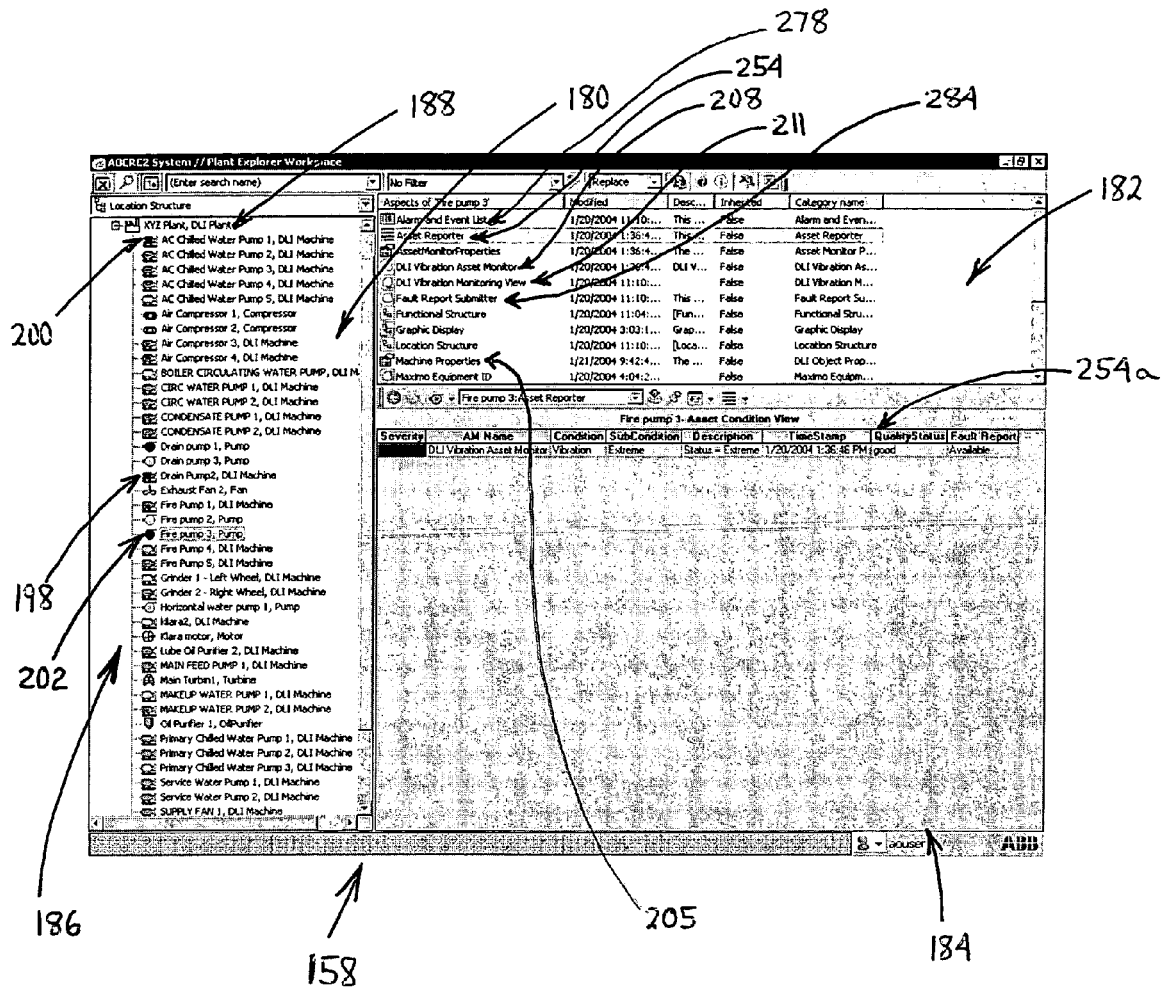
FIG. 15 is a screenshot showing an asset reporter aspect view of a machine object.

When the CMMS 32 receives a fault report 269 from the process automation system 30 for a vibration-monitored machine, the CMMS 32 creates a work order 290 for the machine. An aspect for active work orders 290 is provided for each machine object. For example, an active work order aspect 292 is provided for the machine object 200, as shown in FIG. 14. The active work orders aspect for a machine object shows all of the work orders that are open or active for the machine to which the machine object corresponds. For example, the active work order aspect 292 has a view 292a that shows at least three work orders (namely, 4833, 4829 and 4828) that are open for the machine 18. A work order column (e.g. 292b) of each active work order aspect (e.g. aspect 292) contains links to the CMMS 32. Clicking on a link for a particular work order opens a portal that contains a CMMS view of the work order 290.

URLs are created for all of the asset monitor aspects (e.g. 206, 207, 208), vibration monitoring view aspects (e.g. 209, 210, 211), asset reporter aspects (e.g. 248, 250, 252, 254, 256), fault report submitter aspects (e.g. 280, 282, 284) and active work order aspects (e.g. 292), thereby permitting a thin client such as the remote client 84 to access said aspects. The foregoing aspects can be accessed from the thin client view 264 of the asset condition tree 262 by right clicking on the plant object 188 or a machine object, as the case may be, which causes a context menu to be displayed. The context menu lists the aspects that are available for access through the web browser of the thin client. A desired aspect is accessed by clicking on the aspect in the context menu.

Integrating the vibration monitoring system 24 with the process automation system 30, as described above, extends vibration monitoring of the machines 14, 18, 20 and other machines of the enterprise 10 to include visibility to process operators (who are responsible for controlling the process) in a single window and to provide proper notifications to plant personnel. The work order generation triggers the appropriate personnel into repair action prior to a costly failure. Besides avoiding the costly shutdown, the owner of the enterprise 10 also realizes a benefit from the proper deployment of resources. Maintenance and repair personnel can be placed in other jobs or plant locations instead of hanging out and waiting for failures. In addition, the audit history in the electronic work order system can be used to analyze the frequency and costs of repairs for scheduling and ordering processes. Moreover, the electronic recording of the maintenance information can also provide information for expediting production and allow comparisons to data from other areas for the plants or from other lines.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A system for controlling and monitoring machinery in a process of an enterprise, comprising:
    (a.) a data collector for collecting vibration data from a machine in the enterprise;
    (b.) a vibration work station connected to the data collector to receive the vibration data, the vibration work station comprising:
        a first computer;
        a diagnostic software system running on the first computer, said diagnostic software system being operable to generate a condition diagnosis of the machine based on the vibration data collected from the machine;
        a web server running on the first computer and operable to generate a web page containing the condition diagnosis;
    (c.) a process automation system for monitoring and controlling the process, the process automation system being connected to the vibration work station, the process automation system including:
        a controller having a microprocessor that runs a control routine for controlling at least a portion of the process;
        a second computer;
        a monitor connected to the second computer;
        an asset monitoring system running on the second computer and being communicably connected to the diagnostic software system to receive the condition diagnosis therefrom, the asset monitoring system being operable to generate and transmit an electronic asset condition document when the condition diagnosis of the machine changes;
        a human system interface (HSI) running on the second computer and communicably connected to the web server and the asset monitoring system to receive asset condition documents therefrom, the HSI being operable to generate and display on the monitor a plurality of views comprising:
            a first view comprising dynamic elements that can be manipulated by an operator to change control parameters for the process;
            a second view comprising the web page containing the condition diagnosis;
            a third view from which an operator may initiate a transmittal of an electronic fault report when an asset condition document indicates that the condition diagnosis is for an abnormal condition; and
    (d.) a maintenance management system connected to the process automation system to receive fault reports therefrom, the maintenance management system comprising a third computer and a maintenance application running on the third computer, the maintenance application being operable to generate an electronic work order when the maintenance application receives a fault report, the work order including a description of work that needs to be done to the machine to remedy the abnormal condition.

2. The system of claim 1, wherein the views further comprise a fourth view displaying objects representing assets of the enterprise respectively, the objects including a machine object for the machine.

3. The system of claim 2, wherein the fourth view and the second view are displayed on the monitor at the same time.

4. The system of claim 2, wherein each of the objects for the assets has a plurality of aspects associated therewith, each aspect containing information about its associated object, wherein the views further comprise a fifth view displaying a list of the aspects of the machine object.

5. The system of claim 4, wherein the fifth view, the fourth view and the second view are displayed on the monitor at the same time.

6. The system of claim 4, wherein the HSI further comprises first and second workplaces, and wherein the first view is displayed in the first workplace and the second, third, fourth and fifth views are displayed in the second workplace.

7. The system of claim 4, wherein the machine object has a monitoring aspect for the web page.

8. The system of claim 7, wherein the HSI is operable to display a window on the monitor comprising first, second and third frames;

wherein the fourth view is displayed in the first frame; and wherein selection of an object in the fourth view displays the aspects of the selected object in the second frame, and selection of an aspect in the second frame displays a view for the aspect in the third frame.

9. The system of claim 8, wherein the machine object has been selected in the fourth view to display the fifth view in the second frame, and the monitoring aspect has been selected in the fifth view to display the web page in the second view in the third frame, whereby the fifth view, the fourth view and the second view are displayed on the monitor at the same time in the window.

10. The system of claim 2, wherein when the HSI receives an asset condition document for an asset, the object corresponding to the asset changes its appearance.

11. The system of claim 1, wherein the vibration work station, the process automation system and the maintenance management system are connected together by Ethernet cables.

12. The system of claim 1, wherein the diagnostic software system comprises a database containing baseline vibration data for a plurality of different types of machines, and an application program operable to compare the vibration data collected from the machine to baseline vibration data stored in the database for the type of the machine.

\* \* \* \* \*